April 29, 1930. J. H. HILLIARD 1,756,487
CAN OPENER
Filed Aug. 16, 1929
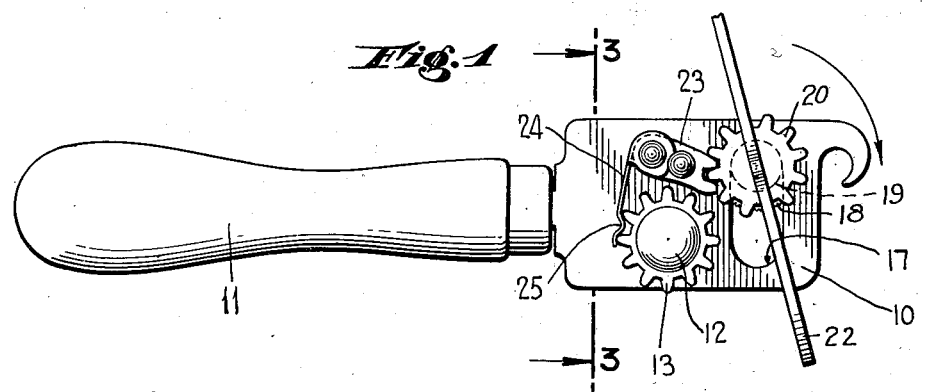
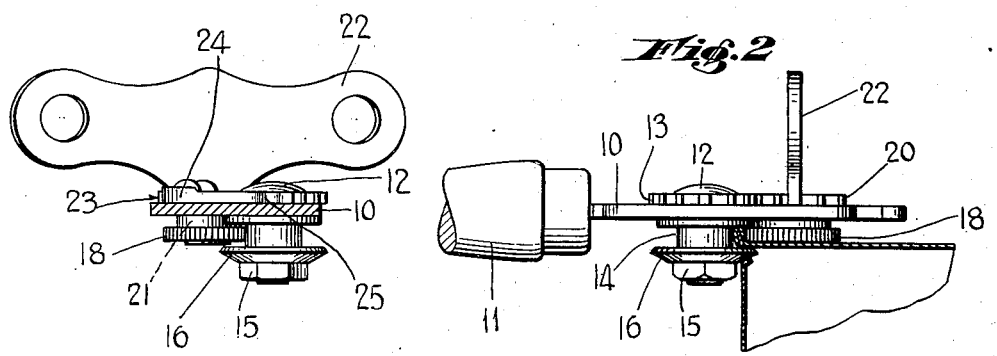
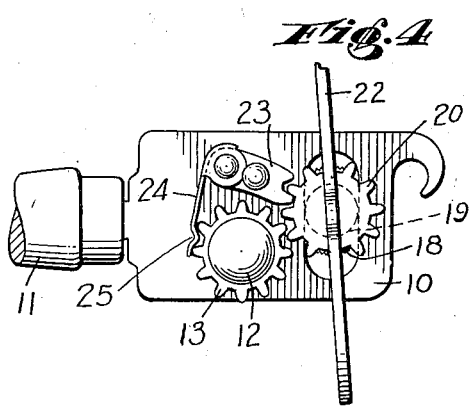
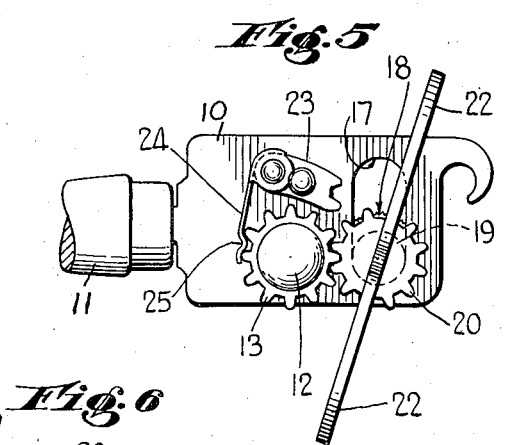
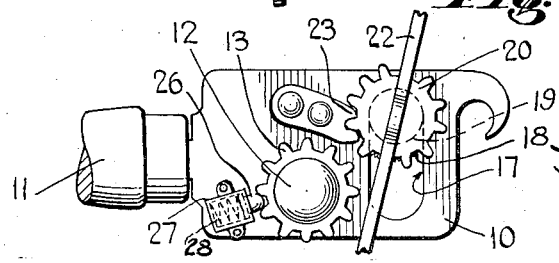
INVENTOR.
John H. Hilliard
BY
ATTORNEY Patented Apr. 29, 1930

1,756,487

UNITED STATES PATENT OFFICE

JOHN H. HILLIARD, OF NEW YORK, N. Y., ASSIGNOR TO THE TURNER AND SEYMOUR MFG. COMPANY, A CORPORATION OF CONNECTICUT

CAN OPENER

Application filed August 16, 1929. Serial No. 386,418.

My invention relates to can openers of a type comprising a pair of toothed members movable into and out of operative engagement with one another, and the invention has for an object to provide means normally holding one of the members, while disengaged, in such position that the teeth thereof will mesh properly with the teeth of the other member when the two members are moved into engagement. For instance, certain can openers comprise a cutter wheel and an opposed feed wheel, each provided with a toothed pinion, the wheels being movable toward and from each other to operative and inoperative positions, respectively, said wheels bringing the pinions into mesh when in operative position, so that rotation of one wheel will insure positive rotation of the other. In some can openers of this general type, a fixed rack is provided adjacent the driven pinion and in such position as to mesh with the driving pinion when the latter is out of operative position, so that by merely rotating the driving pinion in operative direction, the latter will be fed, by its engagement with the rack, into engagement with the driven pinion. Conversely, when the driving pinion is rotated in reverse direction, it will tend to move into engagement with the rack and upon meshing with said rack will travel clear of the driven pinion. Obviously, to insure a smooth passage of the driver from the rack to the driven pinion, or from the latter to the rack, it is important that the teeth of the driven pinion bear a definite space relation to the rack. However, since the rack is fixed and the driven pinion is rotatable, the relative tooth spacing may at times be such that when the driver is being moved into engagement with the driven pinion, the teeth of the pinions will not move into proper meshing register, but will strike end-on and jam, or when turning in the reverse direction, the teeth of the driver will jam against the teeth of the rack instead of meshing properly therewith.

It is an object of the present invention to overcome these difficulties by providing means for maintaining the pinions in such relation as to insure proper meshing register when the pinions are moved into engagement with each other.

Another object of the invention is to provide means urging the driven pinion to such angular position with relation to a fixed rack that a driving pinion may be moved into mesh, without jamming, from the rack to the driven pinion or vice versa.

Another object is to provide resilient means engaging the driven pinion which will tend to arrest the latter with the teeth thereof in a predetermined position.

More specifically, an object of the invention is to provide a spring pressed finger adapted to bear against the driven pinion to determine the tooth position of the latter when idle. By this I mean that the finger will not prevent the driven pinion from being rotated, but will tend to bring the latter to rest, when relieved of pressure by the driving pinion, with its teeth occupying a predetermined angular position, and thereafter will retain the driven pinion in such position until it is again actuated by the driving pinion.

Other objects and advantages will appear in the following description of two embodiments of my invention, and thereafter the novelty and scope of the invention will be pointed out in the claims.

In the accompanying drawings;

Figure 1 is a plan view of a can opener embodying my invention;

Fig. 2 is a fragmentary side elevation of the same, showing the can opener applied to a can, the latter being shown in section;

Fig. 3 is a view in section taken on the line 3—3 of Fig. 1 and viewed in the direction of the arrows;

Fig. 4 is a fragmentary plan view of the can opener, but showing the driving pinion about to move into mesh with the driven pinion;

Fig. 5 is a similar fragmentary plan view showing the two pinions in operative or meshing engagement; and Fig. 6 is a fragmentary plan view of a modified form of my invention.

As shown in the drawings, the can opener comprises a frame plate 10 fitted with a main handle 11. Journaled in the plate 10 is a bolt 12 which has a toothed pinion 13 fixed thereon. The pinion bears against the upper or outer face of the frame plate. Mounted on the bolt and bearing against the opposite face of the frame plate 10 is a flanged collar 14. Secured on the bolt between this collar and a nut 15 is a cutting wheel 16. The latter is keyed to the bolt.

Adjacent the pinion 13 the plate 10 is formed with a slot 17 which extends substantially at right angles to the axis of the handle 11. A knurled feed wheel 18 is adapted to bear against the under face of the plate 10 and is formed with a hub 19 which has sliding engagement with the slot 17. Mounted on the hub and bearing against the upper face of the frame plate is a driving pinion 20. The pinion 20 and hub 19 are fixed upon the shank 21 of a winged handle 22.

Mounted on the upper face of the plate 10, adjacent the pinion 13 and in position to mesh with the teeth of the pinion 20, is a fixed rack 23. The position of the rack is such that when the handle is turned in the direction of the arrow in Figs. 1 and 4 it will be fed, by engagement with the rack 23, along the slot 17 and into mesh with the pinion 13. When the handle 22 is turned in the opposite direction, the pinion 20, reacting against pinion 13, will tend to move reversely in the slot 17, engaging the teeth of the rack 23 and restoring the parts to the position shown in Fig. 1.

The can opener as so far described is a standard commercial product, and I claim no novelty therein.

It will be evident that when the parts are in the position shown in Fig. 1, the pinion 13 no longer meshes with the pinion 20 and may be rotated relatively to the latter, but unless such rotation is controlled or prevented, the pinion 13 might assume such a position that when the pinion 20 was fed forward again, the teeth of the latter would strike against the ends of the teeth of the pinion 13, and the pinions would bind instead of meshing properly. To control the tooth position of pinion 13, I provide a spring finger 24 which is fixed at one end to the plate 10, while its opposite end is formed with an indentation 25 that bears against and enters between the teeth of pinion 13, but will ride over the teeth as said pinion is rotated in either direction. However, the spring finger tends to hold the pinion 13 against idle movement and in predetermined tooth position with respect to the rack 23, so that when the driving pinion 20 is rotated in the direction of the arrow in Fig. 4 it will shift from engagement with rack and into engagement with pinion 13 without jamming.

The indentation 25 is rounded so as to prevent it from coming to rest on the end of a tooth. Instead, it will slip off the tooth and impel the same in one direction or the other, until the indentation is centered between two adjacent teeth. Thus, when the driver is turned in reverse direction and reacts against the driven pinion, the latter, if not already in proper tooth position, will turn under the influence of the spring finger until it assumes such proper position with respect to the rack, so that the driver may shift smoothly into meshing engagement with said rack.

The spring finger also offers enough resistance to provide an abutment against which the driver may react when reversed, causing the latter to feed back into engagement with the rack and clear of the driven pinion.

A modification of the device is shown in Fig. 6, wherein a spring pressed plunger is used in place of the spring finger. The plunger 26 is fitted to slide in a casing 27 secured to the frame 10. A compression spring 28 bears against the inner end of the plunger, pressing the latter outward. The outer end of the plunger is rounded and is so positioned as to enter between two adjacent teeth of the pinion 13 when the latter bears the desired tooth position with respect to the rack 23. The shape of the plunger is such that it will snap over the teeth of the pinion 13 as the latter is rotated, but will always tend to restore the pinion to the predetermined tooth position.

While the present invention has been described as applied to a particular type of can opener, it will be understood that such application is illustrative and not limitative of my invention and that the invention may also be applied to other forms of can opener. Furthermore, I reserve the right to make such changes in construction and arrangements of parts as fall within the scope of the following claims:

I claim:

1. In a device of the character described, a pair of toothed pinions, means for moving the pinions into and out of operative engagement with each other, and means for maintaining a predetermined relation between said pinions when out of engagement, such that the teeth of the pinions will come into meshing register as the pinions are moved into engagement with each other.

2. In a device of the character described, a pair of toothed pinions, means for guiding one of said pinions into and out of operative engagement with the other, means for retaining the latter pinion in a predetermined position with respect to the teeth thereof while the guided pinion is being moved into engagement therewith, whereby the teeth of the pinions will come into meshing register.

3. In a device of the character described, a pair of toothed pinions, one of said pinions being mounted on a fixed axis, a rack adjacent the latter pinion, a guide along which the second pinion is movable from the rack to the first pinion and vice versa, and means tending to hold the first pinion in predetermined tooth-position with respect to the rack, whereby said second pinion may be shifted from the rack to the driven pinion and vice versa without jamming.

4. In a device of the character described, a driving pinion and a driven pinion, the latter being mounted on a fixed axis, a rack adjacent the driven pinion, a guide along which the driving pinion may be moved to shift from meshing engagement with the rack to meshing engagement with the driven pinion and vice versa, and a spring finger bearing against the driven pinion and tending to hold the latter in such predetermined tooth-position with respect to the rack as to prevent jamming when the driving pinion is shifted from the rack to the driven pinion and vice versa.

5. In a device of the character described, a pair of toothed pinions, means for guiding one of said pinions into and out of operative engagement with the other, and a resilient member bearing against the latter pinion and serving to hold the same against turning while the pinions are disengaged.

6. In a device of the character described, a pair of toothed pinions, means for guiding one of said pinions into and out of operative engagement with the other, and friction means engaging the latter pinion and serving to hold the same against turning while the pinions are disengaged.

7. In a device of the character described, a toothed driving pinion, a toothed driven pinion, means for guiding the driving pinion into and out of operative engagement with the driven pinion, a resilient member bearing against the latter pinion and having an arcuate portion adapted to enter between a pair of the teeth of said driven pinion, whereby the latter will be turned to and arrested in a predetermined tooth-position when said driven pinion is relieved of pressure by said driving pinion.

8. In a device of the character described, a toothed driving pinion, a toothed driven pinion, the latter being mounted on a fixed axis, a rack adjacent the latter pinion, a guide along which the other pinion is movable from the rack to the driven pinion and vice versa, and friction means for holding the driven pinion in predetermined tooth-position with respect to the rack, whereby the driving pinion may be shifted from the rack to the driven pinion and vice versa without jamming.

9. In a device of the character described, a toothed driving pinion, a toothed driven pinion, the latter being mounted on a fixed axis, a rack adjacent the latter pinion, a guide along which the other pinion is movable from the rack to the driven pinion and vice versa, and a resilient finger bearing against the driven pinion and serving to arrest the driven pinion in predetermined tooth-position with respect to the rack, while the driving pinion is being shifted from the rack to the driven pinion and vice versa.

In testimony whereof, I have signed this specification.

JOHN H. HILLIARD.